United States Patent
Alman et al.

(10) Patent No.: US 8,678,932 B2
(45) Date of Patent: Mar. 25, 2014

(54) ONLINE SKILL COMPETITION SYSTEM WITH COMPETITIVE CONSUMER JUDGING AND METHOD

(71) Applicants: Brian M. Alman, Leucadia, CA (US); Ron Posner, San Diego, CA (US); Stuart Swezey, Los Angeles, CA (US)

(72) Inventors: Brian M. Alman, Leucadia, CA (US); Ron Posner, San Diego, CA (US); Stuart Swezey, Los Angeles, CA (US)

( * ) Notice: Subject to any disclaimer, the term of this patent is extended or adjusted under 35 U.S.C. 154(b) by 0 days.

(21) Appl. No.: 13/797,074

(22) Filed: Mar. 12, 2013

(65) Prior Publication Data

US 2013/0237323 A1  Sep. 12, 2013

Related U.S. Application Data

(60) Provisional application No. 61/609,787, filed on Mar. 12, 2012.

(51) Int. Cl.
  *G07F 17/00* (2006.01)
(52) U.S. Cl.
  USPC .................................... 463/42; 463/40
(58) Field of Classification Search
  USPC ..................................... 463/40, 42
  See application file for complete search history.

(56) References Cited

U.S. PATENT DOCUMENTS

| | | | |
|---|---|---|---|
| 6,578,008 B1 * | 6/2003 | Chacker | 705/7.32 |
| 7,258,275 B1 * | 8/2007 | Reddy | 235/384 |
| 8,382,592 B1 * | 2/2013 | Patnaik et al. | 463/40 |
| 2001/0003099 A1 * | 6/2001 | Von Kohorn | 463/40 |
| 2001/0049625 A1 * | 12/2001 | Mowry | 705/14 |
| 2002/0091564 A1 * | 7/2002 | Geller | 705/12 |
| 2002/0132656 A1 * | 9/2002 | Lydon et al. | 463/9 |
| 2006/0068818 A1 * | 3/2006 | Leitersdorf et al. | 455/466 |
| 2006/0082068 A1 * | 4/2006 | Patchen | 273/430 |
| 2006/0292540 A1 * | 12/2006 | Ehmann | 434/350 |
| 2010/0299688 A1 * | 11/2010 | Howcroft et al. | 725/5 |
| 2012/0028232 A1 * | 2/2012 | Findlay | 434/362 |
| 2013/0184082 A1 * | 7/2013 | Patchen | 463/42 |
| 2013/0222597 A1 * | 8/2013 | Brink et al. | 348/157 |

* cited by examiner

*Primary Examiner* — William Brewster
*Assistant Examiner* — Jason Skaarup
(74) *Attorney, Agent, or Firm* — Charmasson, Buchaca & Leach, LLP

(57) ABSTRACT

An online computer network utilization system for supporting an online skill competition such as guitar playing prowess among personal entrants and an online competitive contest associated with the skill competition where online consumer contestants can view, judge and contest with one another over the successes and failures of the skill competitors. The system handles the solicitation for entrants in the skill competition and online consumers for the viewing and judging of the competition as well as a fantasy sports-styled contest among viewers/judges, tracks performances, tabulate votes, declares winners, awards prizes and facilitates online advertising.

13 Claims, 4 Drawing Sheets

ONLINE SKILL COMPETITION SYSTEM WITH COMPETITIVE CONSUMER JUDGING AND METHOD

PRIOR APPLICATION

This application claims the benefit of U.S. Provisional Patent Application Ser. No. 61/609,787, filed 2012 Mar. 12 incorporated herein by reference.

FIELD OF THE INVENTION

The invention relates generally to online computer network systems and business methods, and more specifically to a method for encouraging online consumers to engage in the judging of an online competition among entrants associated with a particular type of skill such as musicianship.

BACKGROUND

Talent competitions have likely been around since prehistoric times when high status was conveyed on that one individual who could throw a rock further or with greater accuracy, or hit two stones together in a rhythm better than anyone else.

For years talent competitions have showcased athletes, marksman, gamers, students, and emerging artists, to name a few. More recently, television programs such as American Idol have provided enhanced audience participation by allowing audience votes to help determine the winner.

Computer networks such as the Internet offer the potential for even greater participation in talent competitions. Chacker, U.S. Pat. No. 6,578,008 incorporated herein by reference discloses an online system for recruiting talent utilizing the uploading of performances from the competitors and public voting.

Online contests among the consuming public have been popular where the public can try to select a winner prior to the winner being revealed. Online games such as online fantasy football as realized for example on CBS Sportsline (found at www.sportsline.com) further engage the consuming public to attempt to select the most successful players during a season of a sport such as professional football presented by the National Football League (NFL) and award points to the consumers based on the actual weekly performances of NFL players.

The Internet has been found to be a rich resource for advertising goods and services due in large part to the ability to identify and track the behavior of online consumers in great detail. Thus, drawing online consumers to a particular website for targeted advertising is a frequent goal of online merchants. One way to draw online consumers is by providing unique entertainment content. Although the entertainment content can be similar to a television program, providing the content online sets the stage for reaping the benefits of online interactivity and advertising.

Thus many web sites have taken to generating original online content to entice online consumers to visit their site. One such web site is the YouTube site available at www.youtube.com. YouTube Original Channels service offers new broadcast-quality content 24 hours a day, 7 days a week for any number of topics.

There is a need for an online system which provides both enhanced feedback, greater involvement, and/or entertainment of consuming public viewers over prior systems and methods.

The instant invention results from an attempt to further improve the entertainment and greater involvement of viewers of online competitions.

SUMMARY

The principal and secondary objects of the invention are to provide an improved involvement of viewers of online competitions.

These and other objects are achieved by an online supporting system which manages a competition for a particular skill among online entrants and allows for and conducts an online contest for viewers who can judge the competition.

The original text of the original claims is incorporated herein by reference as describing features in some embodiments.

In some embodiments there is provided an online computer network system utilization method for encouraging online public involvement in viewing and judging a skill competition and viewing advertising, said method comprising the steps of: (a) providing a web site over global computer networks by a supporting system for plurality of online entrants; (b) communicating with said web site by the entrants worldwide by uploading self-produced preliminary representations of their works and personal information to said web site in order to pre-screen said entrants; (c) pre-screening said entrants to select a plurality of competitors; (d) managing a competition involving said competitors in a series of successive rounds; (e) conducting an online consumer contest via said web site, wherein said conducting comprises: accepting a plural number of online viewer contestants from said consuming public; and, for each of said contestants: viewing by said contestant of at least one of said preliminary representations; selecting by said contestant a preferred subset of said entrants; awarding points to said contestant based on the performance success of the entrants associated with said preferred subset in said competition; maintaining a database of advertisements; and, directing at least one of said advertisements to each of said contestants during said contest.

In some embodiments said selecting comprises ranking said subset of selected entrants in order of preference.

In some embodiments the method further comprises making at least one of the preliminary representations and personal information of said entrants available to the consuming public for the review by the consuming public via said web site; and, obtaining consumer feedback from the consuming public via said web site regarding which of the competitors the consuming public prefers.

In some embodiments the method further comprises: making said rounds available to the consuming public for the review by the consuming public via said web site; and, during at least one of said rounds, obtaining consumer feedback from the consuming public via said web site regarding which of competitors is to be treated differently in said competition as a result of said round.

In some embodiments said communicating comprises: providing a retail video capture kiosk for facilitating generation of a preliminary representation by said artist and said uploading.

In some embodiments the method further comprises the step of generating an opinion poll based on said consumer feedback.

In some embodiments the method further comprises: mentoring said competitors using at least one expert in a skill type associated with said competition.

In some embodiments the method further comprises: viewing said mentoring by said consuming public in a video chat session.

In some embodiments the method further comprises awarding points to said contestant based on selecting a successful competitor in one of said rounds.

In some embodiments the method further comprises wagering points by said contestant in association with said selecting during at least one of said rounds.

In some embodiments there is provided an online computer network system programmed for encouraging online public involvement in viewing and judging a skill competition and viewing advertising, said system comprising: an online supporting system over global computer network including a web site for managing a skill competition among competitors and conducting an online consumer contest via said web site; an online entrants and contestants database accessible by said web site; a content database including uploaded self-produced preliminary representations of said entrants works and personal information accessible by said web site; wherein said consumer contest comprises: a plural number of online viewer contestants from said consuming public; and, for each of said contestants: a viewing by said contestant of at least one of said preliminary representations; a selection by said contestant of a preferred subset of said entrants; a number of points awarded to said contestant based on the performance success of the entrants associated with said preferred subset in said competition wherein said points are redeemable for merchandise advertised during said viewing.

In some embodiments there is provided a system which further comprises: a statistics database in communication with said web site; and a content database in communication with said web site, said web site storing entrant information in said entrant and contestant database, storing the representations in said content database, storing consuming public information in said entrants and contestants database and storing web site use information by the consuming public in said statistics database, said content database being searchable by the consuming public for consideration by the consuming public world-wide, and wherein said supporting system is utilized for analyzing consuming public feedback and updating said databases.

In some embodiments there is provided a system which further comprises: an e-commerce database in communication with said web site; wherein said content database comprises a video clip database; and, wherein said entrants and contestants database comprises an online voting database and a points tabulation database.

DESCRIPTION OF THE EXEMPLARY
EMBODIMENT OF THE INVENTION

Figure 1:
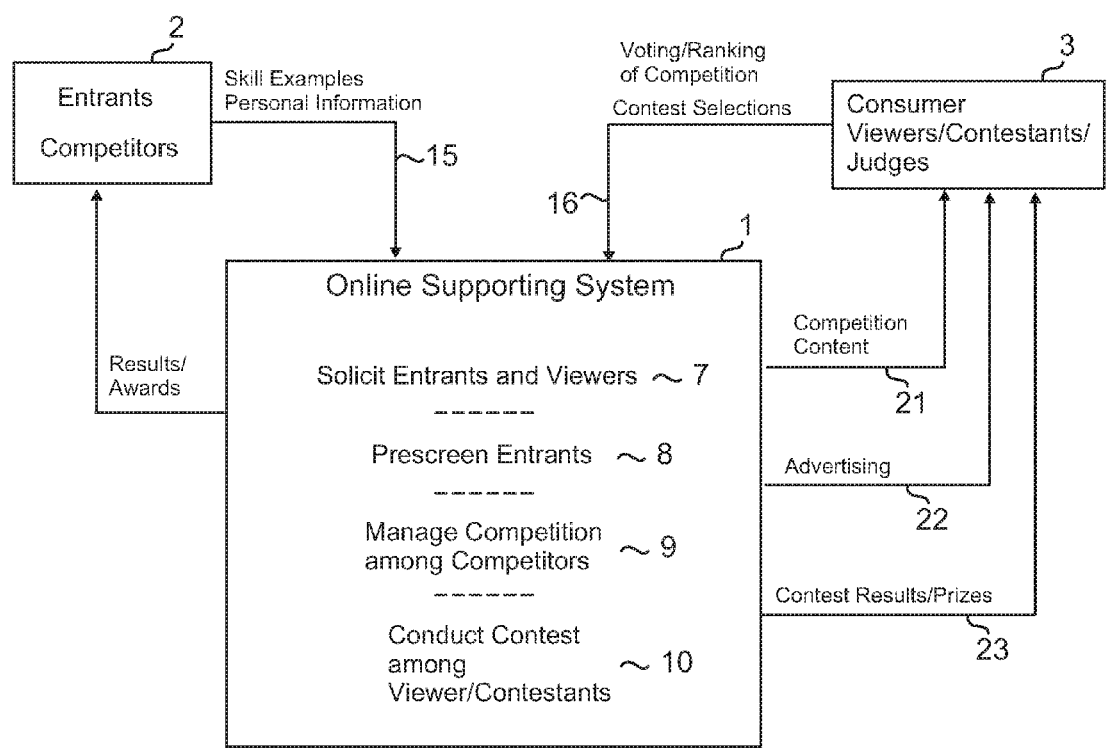
FIG. 1 is a block diagram of the supporting system for the online competition and associated viewer contest according to an exemplary embodiment of the invention.

Referring now to the drawing there is shown in FIG. 1 a system 1 for supporting an online skill competition such as guitar playing prowess among personal entrants 2 and an online contest associated with the competition where online consumer contestants 3 can view, judge and contest with one another over the successes and failures of the competitors.

The system handles the solicitation 7 for entrants 2 in the competition and online consumers 3 for the competition and contest. The system also handles the pre-screening 8 of entrants to determine which of the entrants qualify as competitors for the competition. Thus the competitors can be a subset of the entrants. Once the competitors have been selected, the system handles management of the competition 9 to determine a winner or winners from the competitors. Simultaneously, the system conducts the contest 10 among consumers who will view and judge the competitors during the competition.

The system accepts examples 15 of each entrant's skill in the form of multimedia videos, sound clips, images, or other online content self-produced by the entrants and communicated to the system by the entrants. The system also accepts online feedback 16 from consumer viewers/contestants such as voting/ranking of the competitors during the competition and the selections made as part of the consumer contest.

The system provides content 21 involving the competition such as examples of the entrants' skill and videos of the various competition tasks undertaken by the competitors, and reaction of various celebrity judges and mentors, for example. Further, the system provides advertising 22 to the viewer/contestants during all phases of the competition and contest. The system also provides to the viewer/contestants results 23 of both the competition and contest after each round is completed and after the competition is completed whereupon prizes can be sent to the winning contestants. The system can also provides results and awards to the competitors at each stage and at the end of the competition.

Figure 2:
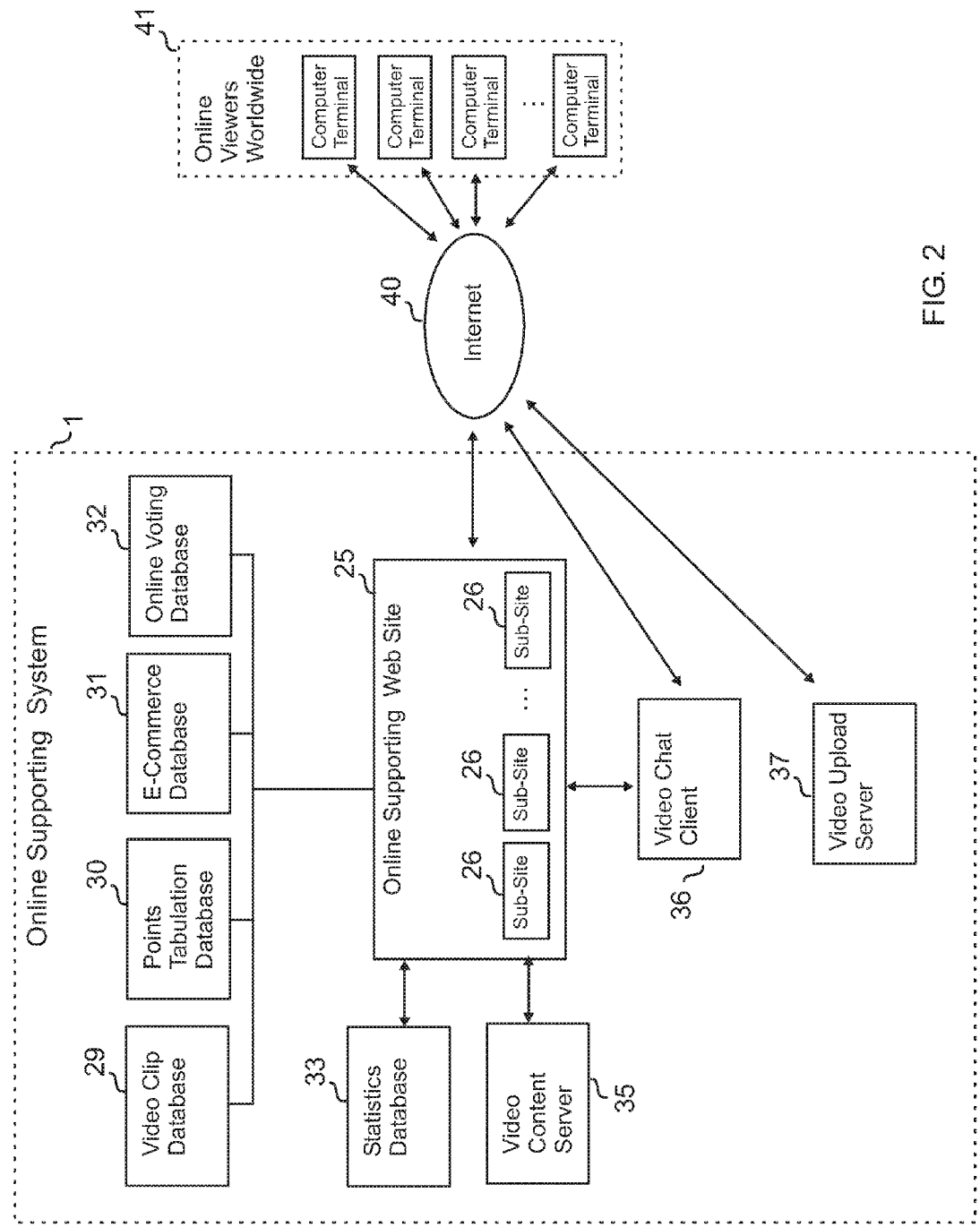
FIG. 2 is a block diagram of the components of a supporting system of FIG. 1.

Referring now to FIG. 2, the system can be implemented using a number of integrated functional computer network components. The online supporting system 1 includes an online supporting web site 25. The supporting web site need not be a single web site but can be made up of a plural number of autonomous sub web sites 26.

Several database modules help track activity and provide content to the supporting web site. These database modules include a video clip database 29, a points tabulation database 30, an e-commerce database 31, an online voting database 32, and a statistics database 33. Separate modules can be provided for handling high-bandwidth tasks such as a video content server 35, a video upload server 36, and a video chat client 37. These various modules communicate data to and from the supporting web site and/or the Internet 40 and on the individual user computers 41.

Figure 3:
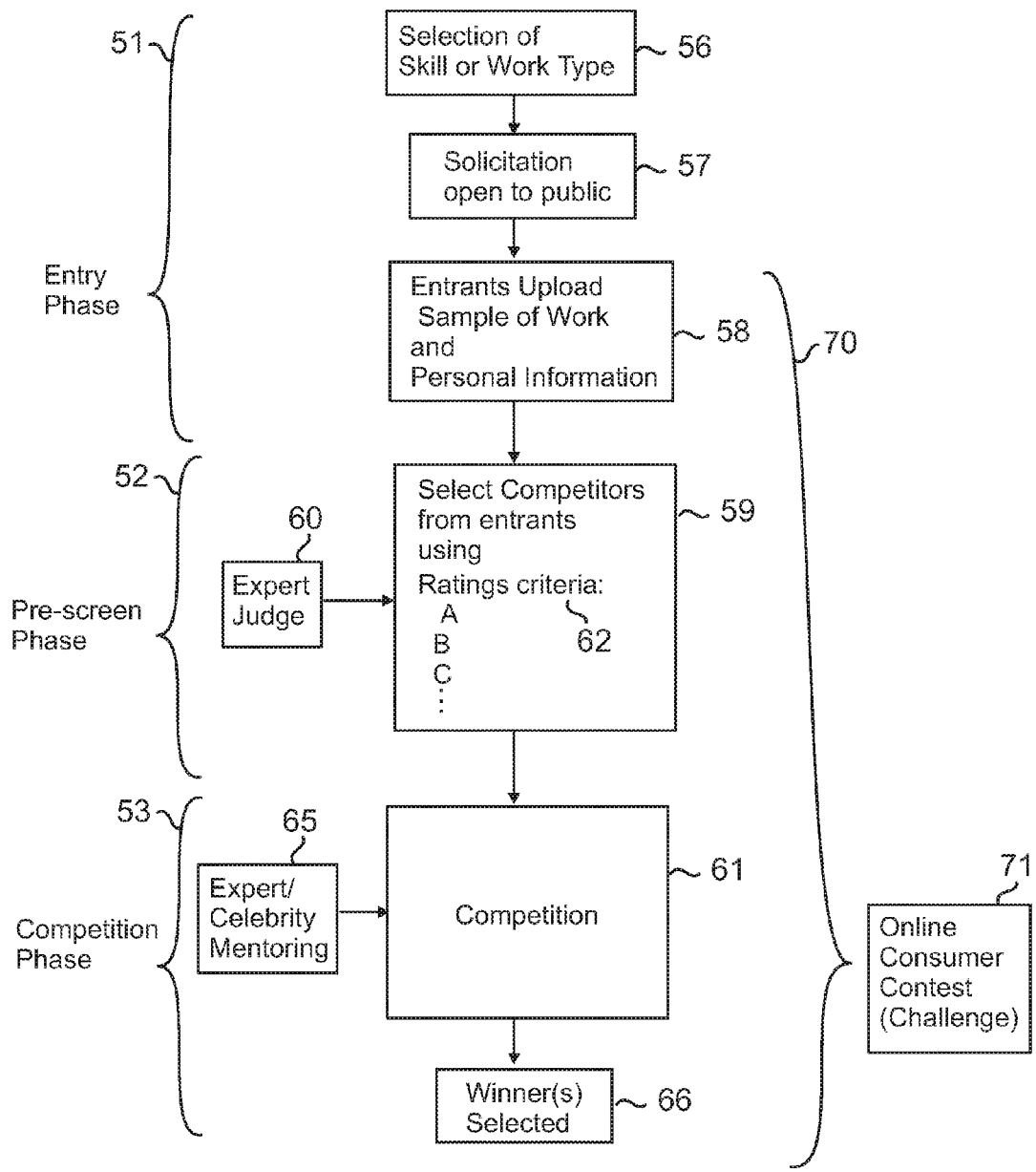
FIG. 3 is a flow chart diagram of the online competition according to an exemplary embodiment of the invention.

Referring now to FIG. 3, the phases 51,52,53 of an exemplary competition will be described.

The first phase 51 of the competition is the selection of the skill or work type 56 for the competition. The system is adaptable to a nearly unlimited range of skills. Skills or work types can include a person's skill or works such as at artistic works, sports works, and business works. For example, skill or work types can include but are not limited to: sports & fitness such as organized or individual sports, team try-outs, running, hiking, racing, mountain climbing, and martial arts; health & wellness, including fitness routines, meditation, yoga, weight loss, and abused substance avoidance; beauty skills such as fashion design, fashion selection, make-up use, and hair dressing; business entrepreneurship including professional skill such as doctoring, computer programming, smartphone or tablet app development, marketing or sales; travel; adventure; child rearing, education, art skills including painting art, sculpture arts, graphic arts, graffiti, movie/video production, music performance, dj performance, percussion performance, rap performance, stand-up comedy, magicianship, song writing, dance, burlesque; skill at determining pop culture trends, music appreciation, dating; science, trivia, computer gaming, animal or vegetable husbandry, cooking, and cooking appreciation to name more than a few.

Further, the skill type can involve individuals other than adult humans, such as the skills of children, pets, robots or even computer programs.

The system is readily adaptable to many existing popular competitions such as professional sports, and pet shows.

Once a type of work or skill is selected, for example prowess at guitar playing, a solicitation is placed 57 on a supporting web site requesting entrants from the general public. Entrants communicate with the web site by uploading 58 self-produced preliminary representations, samples or examples of their work or skill. In this example entrants would upload self-shot videos of themselves playing guitar. The system can help entrants produce self shot videos by providing video capture kiosks at retail locations for facilitating the generation of a preliminary representation by the entrants and uploading them to the web site. For example a video kiosk can be set up at a music store where the guitarist entrant can sit down with her guitar in front of a video camera and record a performance and optionally upload personality information such as personal stories. The kiosk will also accept contact information for the entrant and allow registration on the support web site.

The preliminary representations by all the entrants are then pre-screened during the pre-screening phase 52. Preferably, human experts 60 in the type of skill or work such as famous or master guitarists, and other human judges such as entertainment experts can judge the uploaded preliminary representations and thus select 59 a subset of the entrants to become the competitors of the competition. For example, from over a thousand guitarist entrants a subset of 100 guitarist competitors can be selected.

The pre-screening process can be made more objective by establishing several rating criteria: A, B, C . . . 62 upon which the entrants are pre-screened. Such criteria can include for example in the guitar prowess skill: A) Chops, B) Charisma, C) Attitude, and D) Backstory. Each entrant can be rated based on each of the criteria. Those entrants scoring best would be selected to more on in the competition. Those not selected could be offer consolation prizes such as coupons for products by vendors sponsoring the competition, offers to act as a body of online judges for the rest of the competition, and potentially an offer to enter the contest part of the system to view and judge the rest of the competition.

Once the competitors have been selected the competition phase 53 begins. The competitors are then subjected to successive rounds of competition 61 which are each judged by the consuming public via the web site. The competition can be run similarly to prior public judged talent competitions such as American Idol brand competitions (available at www.americanidol.com). The consuming public can thus transparently choose by online voting which of the competitors moves on to the next round and who is eliminated by on line voting or ranking the entrants and/or competitors in order of preference.

Each round of the competition can therefore include challenges in which the remaining competitors compete. For example, some challenges might include:

1) Having the competitors show up at an audition for lead guitar with an aspiring garage band that may have placed a want-ad though a forum such as Craig's List (available at www.craigslist.com);

2) Having the competitors become street musicians in a crowded local farmers market or subway station where the winner of that round can be determined by the competitor who made the most money in tips;

3) Having the competitors play along to a karaoke track of a classic rock song where they are allowed to dub in their own guitar solo; and, 4) Having the competitors play secretly at weddings or bar mitzvahs where they unleash some unexpected guitar pyrotechnics and the reaction of the guests help determine winners and losers of the round.

Another aspect of the competition can involve appearances and education by expert/celebrity mentors who connect and encourage the competitors one-on-one and in groups. These mentors further encourage public interest in the competition thus drive further web site attendance while bringing their hard-won experience and musicianship to push each competitor to the limit of his or her ability.

Some rounds can include live events which are added during the competition if interest is warrants it.

In addition, the system can be readily adapted to integrate with other online e-commerce sites which provide for example live auctions for items used by the contestants, and branded merchandise recommended by the mentors. Other sites can be integrated including social networking sites for promotion and sponsor sites.

When the field of competitors has been narrowed to a reasonable number of finalists, the remaining competitors can be showcased in a reality television style program. For example, the competitors can live together and be pitted against one another in a series of ever more ambitious challenges, such as playing along with talented session musicians and music world personalities to showcase their guitar prowess. The viewing public can be further entertained by witnessing the pressure, the conflicts, the peaks of emotion, and the depths of despair in highly dramatic, music-filled productions.

The system is readily adapted to track activities of the competition which occur off line such as on radio or television. For example a dynamic and celebrity-filled live competition finale can be arranged where for example the final three competitors can compete in a live streaming broadcast from a real-world well-known music venue. Viewers of the broadcast can vote in real time to determine the winning competitor 66.

The top contestants can also be present and shown entering their final vote, and a winner or winners declared. The event would readily lend itself to a climax where the winning competitor is accompanied on stage by a re-forming legendary rock band that has been searching for the right lead guitarist. The winner can thus officially be part of the rock music pantheon, ready to go on the road for an upcoming stadium tour.

In addition, users have a stake in the outcome of the competition through a fantasy sports-styled contest that allows them to view performances including the preliminary representations uploaded by the entrants, judge the performances by preselecting entrants, vote or rank performances or entrants at the various phases of the competition, interact with other competitors, and be subjected to advertising from competition sponsors, earn prizes such as consumer preferences such as coupons, and purchase goods and services.

Figure 4:
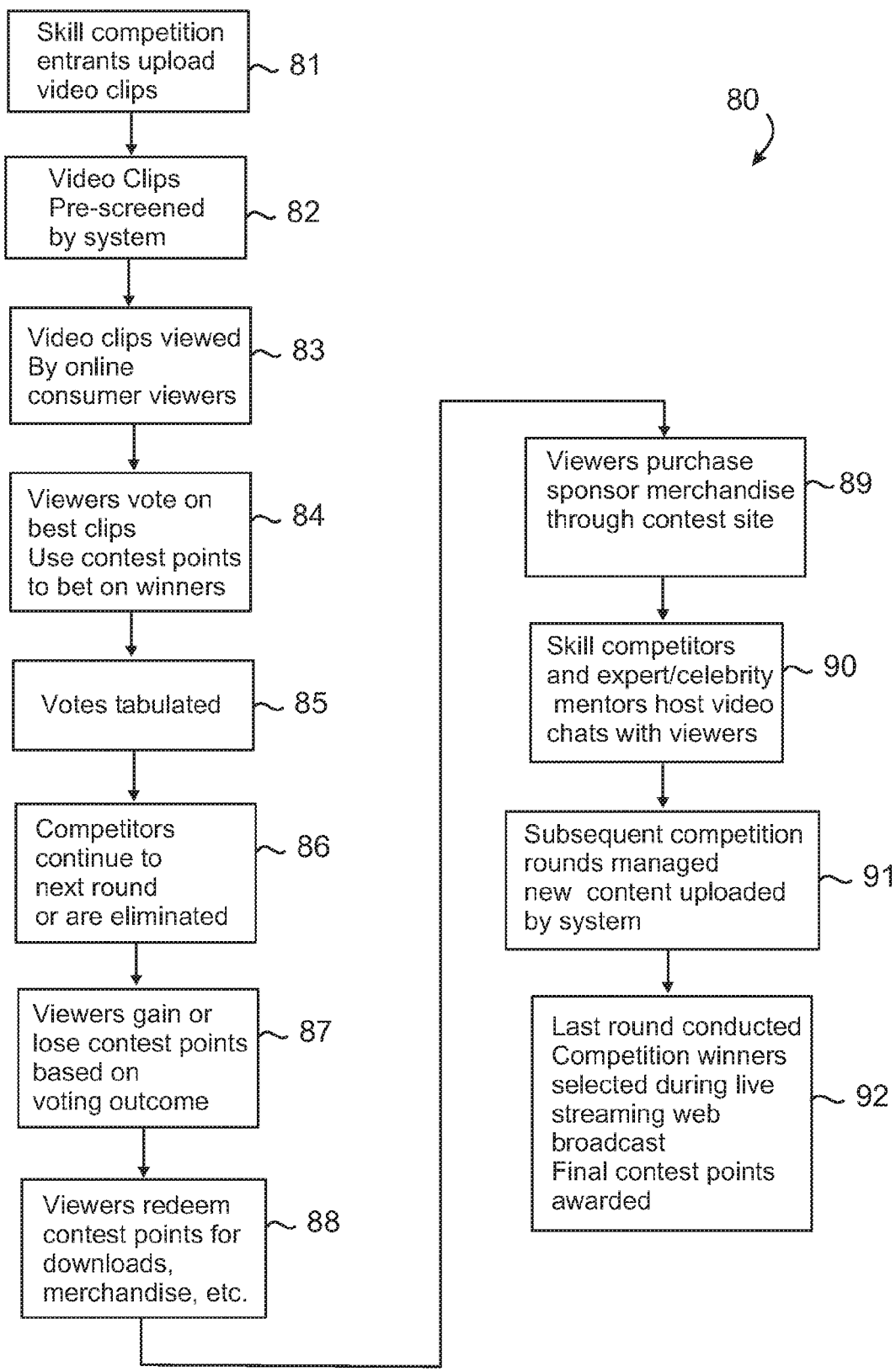
FIG. 4 is a flow chart diagram of an example online competition and associated viewer contest according to an exemplary embodiment of the invention.

Referring now to FIG. 4 there is shown step in an exemplary skill competition and associated online consumer viewer contest 80. Skill competition entrants upload video clips 81. These clips are first pre-screened 82 by the support system administrators to determine whether the clip is a bona fide attempt to enter the competition. Those clips that pass pre-screening can then be viewed by online consumer viewers 83. Viewers are entered into an online contest among each other through which they can vote 84 on which clips/entrants they consider to be best and wager contest points provided by the system. Each contestant can begin the contest with the same points. They can lose points wagered on unsuccessful skill competitors, and win points wagered on successful ones.

The votes are then tabulated 85 to determine which of the competitors are treated differently, such as which competitors move on to the next round and which are eliminated 86. The result of the tabulation also determine what points are awarded/taken away 87 from the contestants for that round. At this time viewers can redeem points 88 for merchandise, downloads or other prizes or promotional items. At any time during the competition or contest, viewers can also purchase merchandise 89 through the system web site or through links to partnering sites.

An important part of the entertainment content available for viewing includes the competitors being tutored or mentored 90 by experts or celebrities in the particular field of the competition. These sessions can be videoed and uploaded for viewing and voting. Also, mentoring sessions can occur as a live video chat where viewer/contestants can interact with the competitor and/or mentor.

Subsequent rounds are managed 91 by the supporting system and viewable through the web site. Each round can include performances or challenges which can be judged by viewer/contestants and fantasy-style points wagered, awarded and/or taken away.

The last round of the competition can be conducted as a live streaming web broadcast where the competition winner or winners are chosen/announced 92 and final contest points awarded to the consumer viewers.

One way of determining prizes can be through the points received during the contest. Contest points can be cashed in for real prizes ranging from downloads and online credits to valuable items such as merchandise and promotional vacations. The prize selection system can be readily adapted to integrate with an e-commerce site run by a sponsor. For example, in a guitar prowess competition, contest points can be redeemed at a sponsoring guitar store's e-commerce site.

The following is an example of the separate rounds for a guitar prowess competition:

Round One—Contestants can view the 100 pre-selected competitors uploaded video clips and rank their favorite competitors. Contestants can also be arranged in leagues of other contestants and "draft" 12 competitors that other contestants in their league cannot draft.

Round Two—In the competition, 12 finalist competitors can be selected by online voting. In the contest, contestants can rank the final competitors and be given points based on their ranking of the first eliminated competitor.

Round Three to Final Round—Competitors are eliminated in each round. Contestants can pre-choose from the remaining competitors a win, place and show competitor. The final first, second and third finishing competitor determines which contestant has done the best. More points are awarded for choosing the correct last three competitors in the earlier rounds. For example, contestants can be awarded extra points for having picked the first, second, and third place finishers in the correct order, and extra points for having picked a the winner or finalists during the first round The competition can then move on to TV-style production shoots where the remaining competitors can be placed in teams. If this occurs, then points can be awarded to contestant viewers based on how overall teams fare in each round.

Further, it should understood that the viewer contest can be structured to allow contestants to "bet" previously awarded points increasing the volatility of the contestant standings. A contestant lagging behind others after the first few rounds could go "all in" in a round to catch up.

It shall be understood that a primary function of the above described system results in a tangible increase in advertising views provided to viewers and players of the system.

While the exemplary embodiments of the invention have been described, it should be understood that modifications can be made and other embodiments may be devised without departing from the spirit of the invention and the scope of the appended claims.

What is claimed is:

1. An online computer network system utilization method for encouraging online public involvement in viewing and judging a skill competition and viewing advertising, said method comprising the steps of:
   (a) providing a web site over global computer networks by a supporting system for a plurality of online entrants in a skill competition;
   (b) communicating with said web site by the entrants by uploading self-produced preliminary representations of their skills and personal information to said web site in order to pre-screen said entrants;
   (c) pre-screening said entrants to select a plurality of competitors;
   (d) managing a skill competition involving said competitors in a series of successive rounds;
   (e) conducting an online consumer contest via said web site, wherein said conducting comprises:
      accepting a plural number of online viewer contestants from public consumers;
      and, for each of said contestants:
         viewing by said contestant of at least one of said preliminary representations;
         selecting by said contestant a preferred subset of said entrants;
         awarding points to said contestant based on the performance success of the entrants associated with said preferred subset in said skill competition; and,
         wagering points by said contestant in association with said selecting during at least one of said rounds;
   (f) maintaining a database of advertisements; and,
   (g) directing at least one of said advertisements to each of said contestants during said contest.

2. The method of claim 1, wherein said selecting comprises ranking said subset of selected entrants in order of preference.

3. The method of claim 1, which further comprises:
   making at least one of the preliminary representations and personal information of said entrants available to the consuming public for the review by the consuming public via said web site; and,
   obtaining consumer feedback from the consuming public via said web site regarding which of the competitors the consuming public prefers.

4. The method of claim 1, which further comprises:
   making said rounds available to the consuming public for the review by the consuming public via said web site; and, during at least one of said rounds, obtaining consumer feedback from the consuming public via said web site regarding which of competitors is to be treated differently in said competition as a result of said round.

5. The method of claim 1, wherein said communicating comprises:
providing a retail video capture kiosk for facilitating generation of a preliminary representation by said artist and said uploading.

6. The method of claim 3, further comprising the step of generating an opinion poll based on said consumer feedback.

7. An online computer network system utilization method for encouraging online public involvement in viewing and judging a skill competition and viewing advertising, said method comprising the steps of:
(a) providing a web site over global computer networks by a supporting system for a plurality of online entrants in a skill competition;
(b) communicating with said web site by the entrants by uploading self-produced preliminary representations of their skills and personal information to said web site in order to pre-screen said entrants;
(c) pre-screening said entrants to select a plurality of competitors;
(d) managing a skill competition involving said competitors in a series of successive rounds;
(e) conducting an online consumer contest via said web site, wherein said conducting comprises:
accepting a plural number of online viewer contestants from public consumers;
and, for each of said contestants:
viewing by said contestant of at least one of said preliminary representations;
selecting by said contestant a preferred subset of said entrants; and,
awarding points to said contestant based on the performance success of the entrants associated with said preferred subset in said skill competition;
(f) maintaining a database of advertisements;
(g) directing at least one of said advertisements to each of said contestants during said contest; and,
(h) mentoring said competitors using at least one expert in a skill type associated with said competition.

8. The method of claim 7, which further comprises:
viewing said mentoring by said public consumers in a video chat session.

9. The method of claim 1, which further comprises awarding points to said contestant based on selecting a successful competitor in one of said rounds.

10. The method of claim 7, which further comprises wagering points by said contestant in association with said selecting during at least one of said rounds.

11. A system for encouraging online public involvement in judging a competition, said system comprising:
an online supporting system over a global computer network including at least one server programmed to manage a skill competition among competitors and conducting an online consumer contest via a web site;
an online entrants and contestants database accessible by said at least one server;
a content database including uploaded self-produced preliminary representations of said entrants works and personal information accessible by said at least one server;
wherein said databases comprises records reflecting:
a plural number of online viewer contestants from said consuming public;
and, for each of said contestants:
a viewing by said contestant of at least one of said preliminary representations;
a selection by said contestant of a preferred subset of said entrants;
a number of points awarded to said contestant based on the performance success of the entrants associated with said preferred subset in said competition, wherein said points are redeemable for merchandise advertised during said viewing.

12. The system of claim 11, which further comprises:
a statistics database in communication with said at least one server; and
a content database in communication with said at least one server,
entrant information being stored in said entrant and contestant database, said representations being stored in said content database, consuming public information being stored in said entrants and contestants database and web site use information by the consuming public being stored in said statistics database,
said content database being searchable by the consuming public for consideration by the consuming public worldwide, and
wherein said supporting system is utilized for analyzing consuming public feedback and updating said databases.

13. The system of claim 12, which further comprises:
an e-commerce database in communication with said at least one server;
wherein said content database comprises a video clip database; and,
wherein said entrants and contestants database comprises an online voting database and a points tabulation database.

* * * * *